May 28, 1968 F. R. EDWARDS 3,385,076
DEFROST SYSTEM AND PARTS THEREFOR OR THE LIKE
Filed Oct. 23, 1965 4 Sheets-Sheet 1
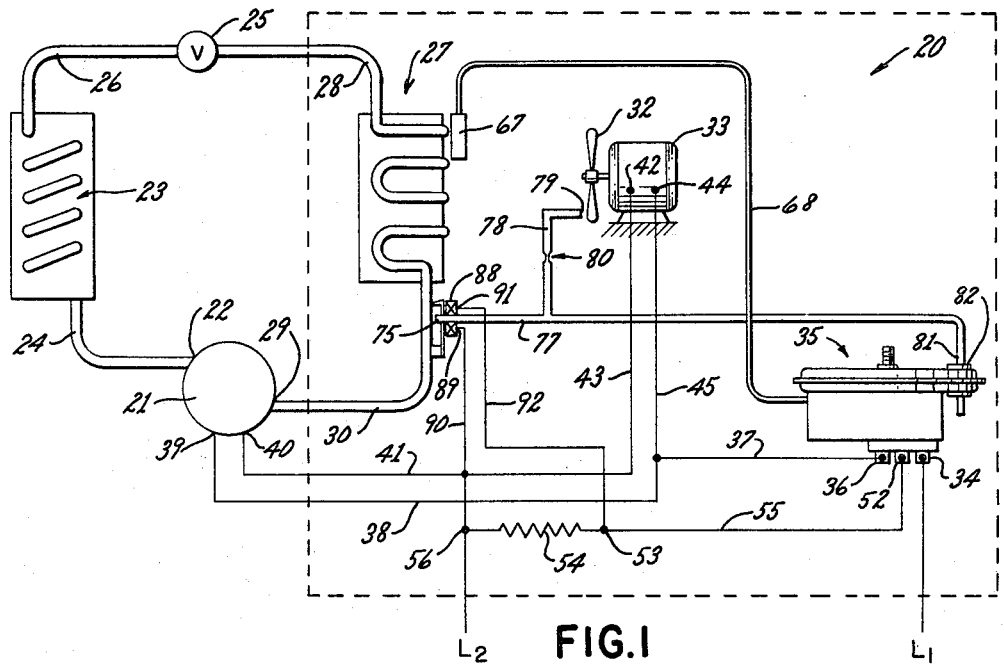
INVENTOR
FRANKLIN R. EDWARDS
BY
Cauden & Cauden
HIS ATTORNEYS

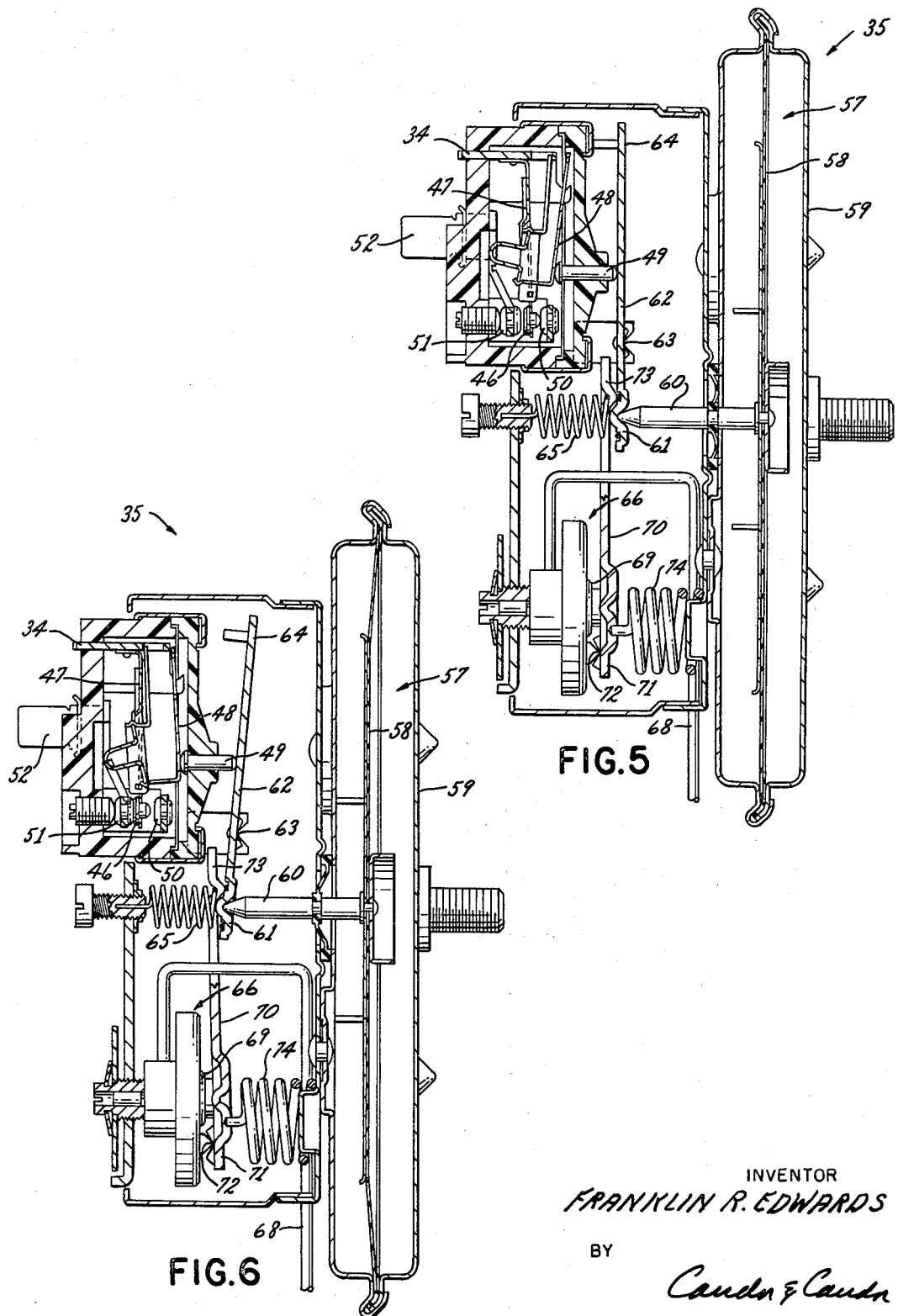

May 28, 1968  F. R. EDWARDS  3,385,076
DEFROST SYSTEM AND PARTS THEREFOR OR THE LIKE
Filed Oct. 23, 1965  4 Sheets-Sheet 3

INVENTOR
FRANKLIN R. EDWARDS
BY
Cauden & Cauden
HIS ATTORNEYS

INVENTOR
FRANKLIN R. EDWARDS
BY
Cauden & Cauden
HIS ATTORNEYS

[United States Patent Office — 3,385,076 — Patented May 28, 1968]

3,385,076
DEFROST SYSTEM AND PARTS THEREFOR
OR THE LIKE
Franklin R. Edwards, Rosemont, Pa., assignor to Robertshaw Controls Company, Richmond, Va., a corporation of Delaware
Filed Oct. 23, 1965, Ser. No. 503,301
12 Claims. (Cl. 62—140)

ABSTRACT OF THE DISCLOSURE

This disclosure relates to a defrost system having a frost creating surface means and heater means for defrosting the surface means when the heater means is activated by a device sensing that a dynamic flow of fluid pressure being directed against the surface means from a nozzle means spaced from the surface means has been restricted a particular amount to automatically indicate that a defrost cycle should take place, the nozzle means being carried by a bimetal member that is heated during a defrosting cycle to move the nozzle means away from the frost creating surface means during such defrosting cycle.

---

This invention relates to an improved automatic defrost system for a refrigerant apparatus or the like as well as to improved parts for such a system or the like.

In the past, automatic defrost systems for defrosting surface means of a refrigerant system has been accomplished by energizing heater means on a time basis whereby at a periodic time in the cycle of operation of the system, the compressor is deenergized and the heater means is energized to tend to heat the surface means of the sysstem to melt the frost thereon, the heater means being energized for a predetermined period of time and, thereafter, being deenergized so that the compressor means can again be energized. Thus, it can be seen that in these prior known systems a defrost action is initiated whether the same is needed or not resulting in the needless waste of power and, therefore, high operating costs.

However, according to the teachings of this invention, an improved defrost system is provided wherein a defrosting cycle is provided only when an actual defrosting is needed.

In particular, this invention provides a system wherein the presence of frost build up on the surface means of the refrigerant system is sensed by pneumatic means in such a manner that when the frost build up reaches a predetermined limit, a defrosting cycle is initiated, the defrosting cycle thereafter being terminated upon the occurrence of an event, such as the lapse of a predetermined time period or upon the temperature of the defrosted surface means of the refrigerant system reaching a predetermined temperature.

Such pneumatic sensing is provided by a nozzle means of this invention which directs dynamic fluid pressure against the frost creating surface means whereby the frost build up gradually restricts the amount of dynamic fluid pressure issuing from the outlet end of the nozzle means in such a manner that the restricted pressure in the nozzle means initiates the defrosting cycle only when the frost build up reaches a predetermined limit.

Accordingly, it is an object of this invention to provide an improved defrost system having one or more of the novel features set forth above or hereinafter shown or described.

Another object of this invention is to provide an improved nozzle means for such a defrost system or the like, the nozzle means having one or more of the novel features set forth above or hereinafter shown or described.

Other objects, uses and advantages of this invention are apparent from a reading of this description which proceeds with reference to the accompanying drawings forming a part thereof and wherein:

FIGURE 1 is a schematic view illustrating the improved defrost system of this invention.

FIGURE 2 is an enlarged, fragmentary, partial cross-sectional view illustrating the nozzle means of the system of FIGURE 1.

FIGURE 3 is a fragmentary cross-sectional view taken on line 3—3 of FIGURE 2.

FIGURE 4 is a view similar to FIGURE 2 and illustrates the nozzle means in another operating position thereof.

FIGURE 5 is an enlarged cross-sectional view illustrating the pneumatic switching means of FIGURE 1.

FIGURE 6 is a view similar to FIGURE 5 and ilustrates the switching means in another operating position thereof.

Figure 9:
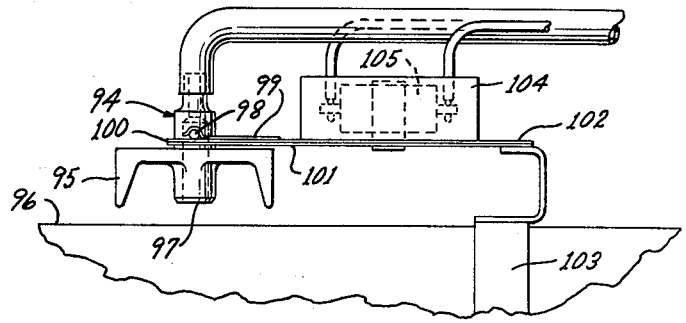
FIGURE 9 is a view similar to FIGURE 8 and illustrates the nozzle means in another operating position thereof.

While the various features of this invention are hereinafter illustrated and described as being particularly adaptable for providing a defrosting means for a refrigerant system or the like, it is to be understood that the various features of this invention can be utilized singly or in any combination thereof to provide defrosting means for other types of systems or the like.

Therefore, this invention is not to be limited to only the embodiments illustrated in the drawings, because the drawings are merely utilized to illustrate one of the wide variety of uses of this invention.

Referring now to FIGURE 1, an improved defrost system of this invention is generally indicated by the reference numeral 20 and includes a refrigerant compressor 21 having the outlet 22 thereof interconnected to a refrigerant condenser 23 by a conduit means 24. The outlet side of the condenser 23 is interconnected to an expansion valve 25 by a conduit means 26, the other side of the expansion valve 25 being interconnected to an evaporator means 27 by a conduit 28. The outlet side of the evaporator means 27 is interconnected to the inlet 29 of the compressor 21 by a conduit means 30.

Therefore, as long as the compressor means 21 is operating, the same receives expanded refrigerant from the evaporator 27 and delivers the same to the condenser 23 whereby the refrigerant is compressed in the condenser 23 to cause the same to have a heating effect at the condenser 23. However, as the compressed refrigerant passes through the expansion valve 25, the same expands in the evaporator 27 to produce a cooling effect at the evaporator 27.

However, since the evaporator 27 is disposed within a closed casing means 31 with the compressor means 21 and condenser means 23 disposed outside the casing means 31, the air circulating in the casing means 31 by means of a suitable fan 32 driven by an electrical motor 33 or the like causes the air in the casing means 31 to pass over the evaporator means 27 and be cooled thereby to cool or refrigerate the remainder of the interior of the casing means 31. For example, the casing means 31 can comprise a conventional domestic refrigerator or freezer.

However, because of repeated opening and closing of the door of the casing means 31 as well as because of the moisture content of the air in the casing means 31, the cooled surface means of the evaporator means 27 cause frost to build up on the same with the subsequent frost decreasing the efficiency of the system 20 the larger the frost build up.

Accordingly, this invention provides an improved means for defrosting the surface means of the evaporator means 27 only when the surface means of the evaporator means 27 requires such a defrosting cycle.

In particular, a power lead $L^1$ is interconnected to a terminal means 34 of a pressure sensing electrical switch construction 35 which normally interconnects the terminal means 34 with a terminal means 36 thereof when no defrosting is required. The terminal 36 is interconnected by a lead 37 to a lead 38 leading to one side 39 of the motor means of the compressor means 21. The other side 40 of the motor means of the compressor means 21 is interconnected to the other power lead $L^2$ by a lead 41.

One side 42 of the fan motor 33 is interconnected to the lead $L^2$ by a lead 43 while the other side 44 of the fan motor 33 is interconnected to the lead 37 by a lead 45.

The electrical switching mechanism 35 is illustrated in FIGURES 5 and 6 whereby it can be seen that the terminal means 34 is electrically interconnected to a movable contact 46 by a snap acting spring blade 47 moved between the positions illustrated in FIGURES 5 and 6 by a lever means 48 actuating by a plunger means 49. When the spring blade 47 is in the position illustrated in FIGURE 5, the contact 46 is in electrical contact with a contact 50 leading to the terminal means 36 illustrated in FIGURE 1. When the contact 46 has been moved to the position illustrated in FIGURE 6, the contact 46 is in electrical contact with a contact 51 leading to a terminal means 52, FIGURE 1, of the switch construction 35.

The terminal 52 of the switch construction 35 is interconnected to one side 53 of an electrical heater means 54 by a lead 55 while the other side 56 of the heater means is interconnected to the lead $L^2$.

The heater means 54 is so constructed and arranged that the same is adapted to defrost the frost creating surface means of the evaporator means 27 when the heater means 54 is energized in a manner hereinafter described, the heater means 54 only being energized when the switch construction 35 is in the position illustrated in FIGURE 6 whereby the heater means 54 is placed across the leads $L^1$ and $L^2$ while the motor means of the compressor means 21 and motor means 33 of the fan 32 are disconnected from the leads $L^1$ and $L^2$ during this defrosting operation. However, when the switch construction 35 moves back to the position illustrated in FIGURE 5, it can be seen that the heater means 54 is deenergized while the motor means of the compressor means 21 and motor 33 of the fan 32 are again placed across the leads $L^1$ and $L^2$ for normal operation thereof.

The pressure operated switch construction 35 includes a chamber 57 defined by a flexible diaphragm 58 and a casing wall 59, the flexible diaphragm 58 carrying a movable plunger 60 engaging one end 61 of a lever 62 fulcrumed in the switch construction 35 at a point 63 whereby the other end 64 of the lever 62 bears against the plunger 49.

The lever 62 is normally urged to the position illustrated in FIGURE 5 by a compression spring 65 whereby the terminal means 34 and 36 are electrically interconnected together for normal operation of the compressor means 21 and fan motor 33.

However, when the pressure in the chamber 57 builds up in a manner hereinafter described to move the diaphragm 58 to the right in the manner illustrated in FIGURE 6, the end 64 of the lever 62 is pivoted to the right whereby the snap spring blade 47 moves the contact 46 out of contact with the contact 50 and into contact with the contact 51 to electrically disconnect the terminal means 34 and 36 while electrically interconnecting the terminals means 34 and 52.

Once the switch construction 35 has been actuated from the position illustrated in FIGURE 5 to the position illustrated in FIGURE 6 by the previously described certain pressure in the chamber 57, the switch construction 35 remains in the actuated position of FIGURE 6 until the occurrence of an event.

In particular, an expansible and contractible power element 66 is carried by the switch construction 35 and has the interior thereof interconnected to a temperature sensing bulb 67 by a conduit 68, FIGURE 1, whereby the temperature sensing bulb 67 senses the temperature adjacent the surface means of the evaporator means 27 for a purpose hereinafter described.

The power element 66 has a movable wall 69 engaging a lever 70 having one end 71 fulcrumed at a point 72 and the other end 73 bearing against the end 61 of the previously described lever 62. The lever 73, as well as the movable wall 69 of the power element 66, is normally biased to the left in FIGURES 5 and 6 by a compression spring 74.

Thus, when a defrost cycle has been initiated in a manner hereinafter described to cause the switch construction 35 to be activated to the position illustrated in FIGURE 6 to interconnect the terminal means 34 and 52 together to operate the heater means 54, the switch construction 35 remains in the position illustrated in FIGURE 6 until the temperature sensing bulb 67 senses a certain temperature at the evaporator means 27, which temperature has been determined to be sufficient to have adequately defrosted the evaporator means 27, whereby the movable wall 69 of the power element 66 has moved to the right in FIGURE 6 a sufficient distance to move the lever 70 in a clockwise direction a distance sufficient to cause counterclockwise movement of the end 64 of the lever 62 to snap the spring blade 47 back to the position illustrated in FIGURE 5. In this manner, the heater 54 is disconnected from the power leads $L^1$ and $L^2$ and the motor means of the compressor means 21 and fan motor 33 are again interconnected to the power leads $L^1$ and $L^2$ for the normal operation of the system 20.

The means for detecting the frost build up on the evaporator means 27 to cause the aforementioned defrost cycle will now be described and reference is made to FIGURES 1 and 2 wherein a nozzle means 75 is provided and has an outlet end 76 disposed in communication with a pneumatic line means 77. The line means 77 has a branch line 78 in communication therewith and is provided with an open end 79 disposed in the path of the circulating air flow caused by the operating fan 32 whereby the operating fan 32 creates a source of dynamic fluid pressure which not only moves over the evaporator means 27 and circulates in the casing means 31, but also is delivered into the line means 77 at the end 79 of the branch line 78. The branch line 78 has a restriction 80 provided therein before the same joins the main line means 77.

The line means 77 also has an end 81 interconnected to a nipple means 82 of the switch construction 35 whereby the interior of the line means 77 is in fluid communication with the chamber 57 of the switch construction 35.

The nozzle means 75 is carried by a moavble end 83 of a bimetal member 84 having the other end 85 interconnected to a clamping means 86, the clamping means 86 being adapted to be interconnected to a frost creating surface of the evaporator means 27, such as the conduit 30 previously described.

The movable end 83 of the bimetal member 84 has an abutment means 87 extending therefrom and adapted to normally engage the frost creating surface means 30 in the manner illustrated in FIGURE 2 whereby the abutment means 87 holds the outlet end 83 of the nozzle means 75 in spaced relation relative to the frost creating surface means 30 for a purpose hereinafter described.

An electrical heater means 88 is carried by the nozzle means 75 and has one side 89 thereof interconnected to the power lead L² by a lead 90 while the other side 91 of the heater means 88 is interconnected to the lead 55 by a lead 92 for a purpose hereinafter described.

With the nozzle means 75 disposed in the position illustrated in FIGURE 2, the system 20 of FIGURE 1 is operated in the conventional manner whereby the switch construction 35 is disposed in the position illustrated in FIGURE 5 to electrically interconnect the terminal means 34 and 36 together and, thus, to place the motor means of the compressor means 21 and the fan motor 33 across the power leads L¹ and L² so that the same will be operated in the conventional manner to provide cooling at the evaporator 27.

With the system in the operating condition illustrated in FIGURE 1, it can be seen that the dynamic air pressure being created by the fan 32 passes in to the branch line 78, through the restrictor 80 and out through the outlet end 83 of the nozzle means 75 against the frost creating surface means 30 each time the fan 32 and compressor means 21 is operated.

However, as the frost builds up on the surface means of the evaporator means 27, it can be seen that the frost, indicated generally by the reference numeral 93 in FIGURE 2, on the surface means 30 builds up toward the outlet end 76 of the nozzle 75 whereby the same progressively restricts the flow of the dynamic fluid pressure issuing out of the outlet end 76 of the nozzle means 75. As the dynamic fluid pressure issuing from the outlet end 76 of the nozzle means 75 is restricted to a predetermined amount by the build up of frost 93 on the surface means 30, the pressure in the chamber 57 of the switch construction 35 correspondingly increases to such an amount that the same causes the diaphragm 58 to move from the position illustrated in FIGURE 5 to the position illustrated in FIGURE 6 whereby the terminal means 34 and 36 are electrically disconnected to disconnect the compressor means 21 and fan motor 33 from the power leads L¹ and L² while electrically interconnecting the terminal means 34 and 52 to not only place the defrost heat means 54 across the power leads L¹ and L² but also to place the heater means 88 of the nozzle means 75 across the power leads L¹ and L².

As the energized defrost heater means 54 is defrosting the surface means of the evaporator means 27, the heat generated by the nozzle heater means 88 causes the movable end 83 of the bimetal member 84 to move away from the surface means 30 in the manner illustrated in FIGURE 4 to carry the outlet end 76 of the nozzle means 75 therewith so that the resulting melting of the frost 93 will not tend to cling in the gap between the frost creating surface 30 and the nozzle 75 as would be the case if the nozzle 75 remained in the position illustrated in FIGURE 2 during the defrost cycle. In particular, this water adjacent the nozzle means 75 must be removed during each defrost cycle to prevent subsequent premature icing up adjacent the nozzle means 75 which would cause false defrosting cycles in the manner previously described.

In addition, the nozzle means 75 should be tilted at some angle relative to the frost creating surface 30 to allow the excess water to slide away during the defrost cycle. For example, see FIGURE 3 wherein the nozzle means 75 is mounted at an angle relative to the conduit 30.

While the nozzle means 75 has been previously described in connection with the heater means 88 to cause the movable end 83 of the bimetal member 84 to move away from the surface 30 in the manner illustrated in FIGURE 4, it is to be understood that the heater 88 could be eliminated and the bimetal member 84 would operate in the same manner as previously described because of the heat produced adjacent the evaporator means 27 by the defrost heater 54.

However, by utilizing the heater means 88 in addition to the defrost heater means 54 for the nozzle means 75 of this invention, the heat generated by the heater means 88 would also evaporate any water collecting on the nozzle means 75 during the defrost cycle.

The system 20 remains in its defrost position until the temperature sensing means 67 determines that the heat of the evaporator means 27 has reached a temperature that is sufficient to have provided adequate defrost of the evaporator means 27 whereby the power element 66 returns the switch construction 35 from the position illustrated in FIGURE 6 back to the position illustrated in FIGURE 5 in the manner previously described. In this manner, the terminal means 34 and 52 are electrically disconnected to deenergize the defrost heater 54 as well as the nozzle heater 88. Simultaneously, the terminal means 34 and 36 are electrically interconnected together to again cause operation of the compressor means 21 and fan motor 33 whereby the system 20 operates in the normal manner until the nozzle means 75 again senses that a defrost cycle should be initiated, the bimetal member 84 returning the nozzle means 75 to the position illustrated in FIGURE 2 after the heater means 54 and 88 have been deenergized.

Figure 7:
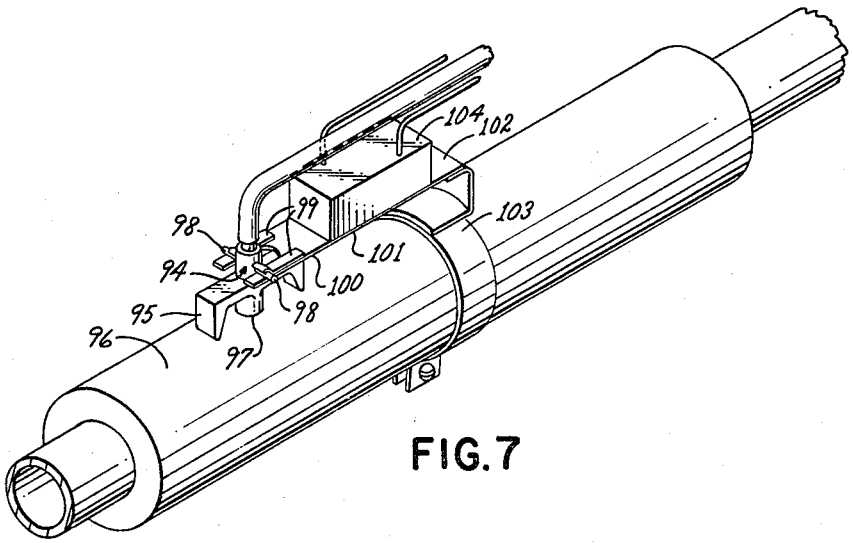
FIGURE 7 is a fragmentary perspective view illustrating another nozzle means of this invention.
Figure 8:
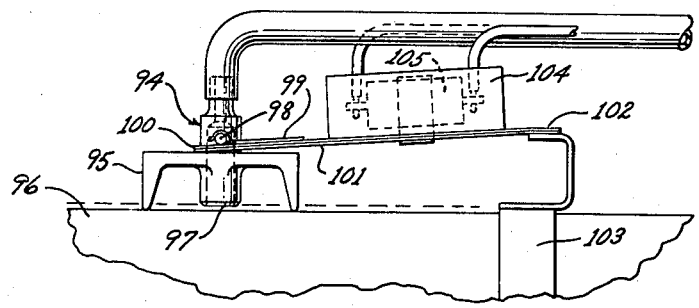
FIGURE 8 is a fragmentary side view of the nozzle means illustrated in FIGURE 7.

Another nozzle means of this invention is generally indicated by the reference numeral 94 in FIGURES 7, 8, and 9 and carries a substantially U-shaped abutment means 95 adapted to abut a frost creating surface 96 in the manner illustrated in FIGURE 8 in order to maintain the outlet end 97 of the nozzle means 94 spaced from the surface means 96, the surface means 96 being illustrated in FIGURE 7 as an accumulator for a refrigerant system or the like.

The nozzle means 94 has a pair of outwardly directed pivot pins 98 extending therefrom and adapted to be attached to spring clips 99 on the movable end 100 of a bimetal member 101, the other end 102 of the bimetal member 101 being interconnected to suitable clamp means 103 for clamping to the frost creating surface means 96 in the manner illustrated in FIGURE 7.

By thus pivotally attaching the nozzle means 94 to the bimetal member 101, it can be seen that pivotal movement can be produced between the nozzle means 94 and the movable end 100 of the bimetal member 101 as the bimetal member 101 and nozzle means 94 move between the positions illustrated in FIGURES 8 and 9 for the purposes previously described so that when the nozzle means 94 is disposed in its frost sensing position of FIGURE 8, the abutment means 95 will positively engage the frost creating surface 96 in a manner to properly space the outlet end 97 of the nozzle means 94 from the surface means 96.

In addition, the bimetal member 101 carries a casing means 104 having an electrical resistor means 105 therein adapted to be interconnected to a suitable power source in substantially the same manner as the heater means 88 previously described whereby the heater means 105 will cause the bimetal member 101 to move the nozzle means 94 away from the surface means 96 to the position illustrated in FIGURE 9 during the defrost cycle for the reasons previously set forth.

Figure 10:
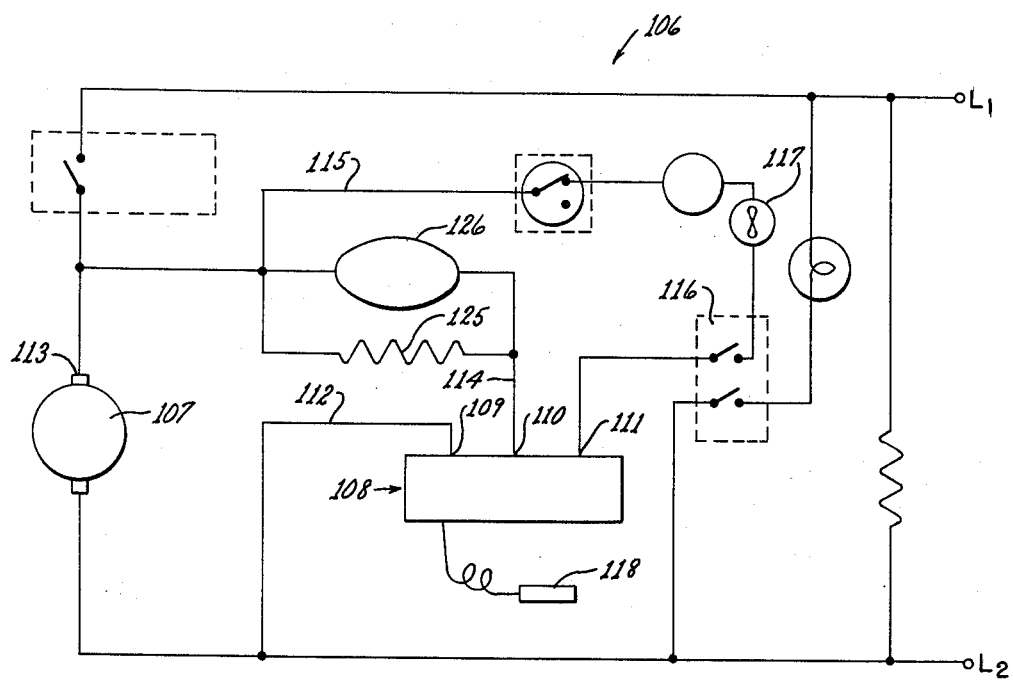
FIGURE 10 is a schematic view illustrating another defrost system of this invention.

The nozzle means 75 or nozzle means 94 of this invention can each be utilized in the system 20 previously described or can be utilized in the system 106 illustrated in FIGURE 10.

In particular, a refrigerant compressor means 107 is provided and is adapted to be placed across the power leads L¹ and L².

A pressure sensing switch construction 108 is provided and operates in a manner similar to the switch construction 35 previously described, the switch construction 108 having three terminals 109, 110 and 11. The terminal 109 is interconnected to the lead L² by a lead 112, the terminal 110 is interconnected to one side 113 of the compressor means 107 by a lead 114, the lead 114 carrying in parallel relationship the nozzle heater means 125 and a solenoid operated refrigerant reversing valve 126 utilized for a purpose hereinafter described, and the terminal 111 is interconnected to the side 113 of the compressor means 107 by a lead 115 passing through a door operating switch 116 and evaporator fan motor 117.

Thus, as long as the nozzle means of this invention senses that a defrost situation should not exist, the switching construction 108 only interconnects together the terminal means 109 and 111 whereby the compressor means 107 and fan motor 117 are operated and the solenoid 126 and nozzle heater 125 are deenergized. However, when the nozzle means initiates a defrost cycle in the manner previously described, the switching means 108 electrically disconnects the terminal means 109 and 111 and interconnects the terminal means 109 and 110 whereby the compressor means 107 remains placed across the leads $L^1$ and $L^2$ while the fan motor 117 is deenergized. However, the nozzle heater 125 is energized as well as the solenoid 126 whereby the compressor 107 now delivers compressed fluid to the evaporator and the condenser now acts as an evaporator for the system 106 whereby the heat caused by the compressed refrigerant in the evaporator defrosts the same whereby the separate defrost heater means 54 previously described is not required.

In addition, such a hot gas defrost means as provided by the system of 106 continues until a timer motor 118 resets the switch construction 108 back to its original position wherein the terminal means 109 and 111 are electrically interconnected together and the terminal means 109 and 110 are electrically disconnected, the timer motor 118 being initially operated when the terminal means 109 and 110 are interconnected together and runs for a predetermined lapse of time before disconnecting the terminal means 109 and 110 and electrically interconnecting the terminal means 109 and 111. When the solenoid 126 is deenergized, the same changes the system back to its original condition wherein the compressor means 107 now delivers the compressed fluid to the condensor and the evaporator now acts as an evaporator in the usual manner.

Therefore, it can be seen that the defrost systems of this invention can either utilize a pressure activated-temperature terminated defrost cycle or a pressure activated-time terminated defrost cycle with the defrost heat either being supplied by an external heater means or by the compressed refrigerant of the system as desired.

Accordingly, it can be seen that the evaporator fan of the defrost systems of this invention is utilized as the source of dynamic pressure fluid eliminating the need of a separate source for such purpose, the defrost system of this invention being one which is operated from a dynamic and intermittent pressure source as opposed to a static and constantly applied pressure source which makes use of the evaporator fan possible in the system of this invention.

The system of this invention determines the measurement of ice accumulation on the frost creating surface means by measuring the ice accumulation as the same builds up in a direction toward the sensing nozzle of this invention to restrict the dynamic air flow therefrom.

In addition, the dynamic air pressure being utilized in the system of this invention is obtained directly from within the refrigerator or freezer and flow is from the nozzle whereby in this arrangement, the nozzle need not be located at any particular point but can be located anywhere the air flow from the sensing nozzle can be directed on a primary cold surface which need not be one exposed to the general circulation path. The evaporator fan of this invention is usually positioned to move the most moist and warmest air over the evaporator means whereby the air delivered to the frost creating surface sensed by the nozzle means of this invention provides the worst possible frosting condition.

Thus, the air delivered to the sensing nozzle of this invention is not altered by the ambient temperature of the pressure sensitive electrical switching means since air delivered to the nozzle means of this invention does not pass through the pressure sensing electrical switching mechanism which permits the pressure switch to be located at any convenient point in the system.

Since the system of this invention causes a sensing for excess frost only when the evaporator fan is operating, which corresponds to operation of the compressor, the defrost action will not be initiated until after the compressor has been in operation. Under such a condition a good share of the liquid refrigerant that accumulated in the evaporator means while the compressor was off, will be removed and distributed throughout the system. Accordingly, when a defrost action is started prior to the compressor being turned on in the manner of this invention, the liquid refrigerant in the evaporator coils acts as a heat sink subtracting from the heat available to melt the defrost. However, in the system of this invention, this heat sink problem is minimized by the removal of the liquid refrigerant from the evaporator coils prior to the initiation of the defrost action.

The manner in which the frost forms on the evaporator means of a refrigerant system depends on the number of times the appliance door is opened during a given period of time. If the door is opened frequently, the frost formed will not be as dense as frost formed in an appliance which has the door thereof opened infrequently. The insulation presented by frost varies inversely with the density of the frost. It is therefore desirable that the system used for frost detection operate in a manner which will cause the defrost action to be initiated in accordance with the type of frost formed. Since the defrost system of this invention delivers dynamic air to a primary cold surface, it has been found that under conditions tending to produce frost of a low density, the frost will bridge the gap between the nozzle outlet and the main frost surface more rapidly than it builds up outside the nozzle area. The frost then increases in density to provide the needed restriction for a build up in pressure for actuation of the pressure operated electrical switching means to initiate the defrost condition. In the case of high density frost condition, there will be a gradual even build up of the frost over the whole frost forming surface prior to the initiation of a defrost cycle.

Accordingly, it can be seen that this invention not only provides an improved defrost system, but also this invention provides improved parts for such a defrost system or the like.

While the form of the invention now preferred has been disclosed as required by statute, other forms may be used, all coming within the scope of the claimed subject matter which follows.

What is claimed is:

1. In a defrost system having a frost creating surface means, means for creating a source of dynamic fluid pressure, a movable nozzle means for directing said source of dynamic fluid pressure against said surface means, means for moving said nozzle means toward and away from said surface means, said nozzle means having an outlet end to be normally spaced from said surface means a predetermined amount by a spacing means carried by said nozzle means and abutting said surface means while said moving means tends to move said nozzle means toward said surface means, a pressure sensing structure for sensing the pressure in said nozzle means, and heating means for defrosting said surface means when said heating means is activated, said sensing structure activating said heating means when the build up of frost on said surface means adjacent said nozzle outlet end restricts said dynamic fluid pressure issuing from said outlet end a particular amount.

2. In a defrost system as set forth in claim 1, said frost creating surface means including an evaporator means of a refrigeration network, said means for creating said source of dynamic fluid pressure being a fan means for forcing air over said evaporator means.

3. In a defrost system as set forth in claim 2, said fan means only creating said dynamic fluid pressure when a compressor of said network is operating.

4. In a defrost system as set forth in claim 2, said heating means includes a reversing valve means for causing the compressor of said network to compress the refrigerant in said evaporator means.

5. In a defrost system as set forth in claim 2, said heating means including an electrical heater energized by said sensing means.

6. In a defrost system as set forth in claim 1, said sensing means including means for terminating said activation of said heating means after the occurrence of an event.

7. In a defrost system as set forth in claim 6, said sensing means including a temperature sensing means which terminates the activation of said heating means when the temperature of said surface means reaches a predetermined temperature during a defrost cycle of said system.

8. In a defrost system as set forth in claim 6, said sensing means including a timer means which terminates the activation of said heating means when said timer means senses a certain lapsed time after said heating means has been initially activated for a particular defrost cycle.

9. In a defrost system having a frost creating surface means, means for creating a source of dynamic fluid pressure, a nozzle means for directing said source of dynamic fluid pressure against said surface means with said nozzle means having an outlet end spaced from said surface means, a pressure sensing structure for sensing the pressure in said nozzle means, and heating means for defrosting said surface means when said heating means is activated, said sensing structure activating said heating means when the build up of frost on said surface means adjacent said nozzle outlet end restricts said dynamic fluid pressure issuing from said outlet end a particular amount, said nozzle means including means to move said nozzle outlet end away from said surface means during the time said heating means is activated.

10. In a defrost system as set forth in claim 9, said nozzle means including means to remove moisture from said nozzle means during a defrost cycle of said system.

11. In a defrost system having a frost creating surface means, movable nozzle means for directing dynamic fluid pressure against said surface means, and means for defrosting said surface means when the frost build up on said surface means restricts the flow of dynamic fluid pressure toward said surface means a particular amount, said nozzle means having an outlet end and carrying an abutment means engaging said surface means to hold said outlet of said nozzle means in spaced relation relative to said abutted surface means, said nozzle means having means to automatically move said nozzle means away from said surface means during a defrosting of said surface means.

12. In a defrost system having a frost creating surface means, means for creating a source of dynamic fluid pressure, a nozzle means for directing said source of dynamic fluid pressure against said surface means with said nozzle means having an outlet end spaced from said surface means, a pressure sensing structure for sensing the pressure in said nozzle means, and heating means for defrosting said surface means when said heating means is activated, said sensing structure activating said heating means when the buildup of frost on said surface means adjacent said nozzle outlet end restricts said dynamic fluid pressure issuing from said outlet end a particular amount, said nozzle means including means to move said nozzle outlet end away from said surface means during the time said heating means is activated, said nozzle means including means to remove moisture from said nozzle means during a defrost cycle of said system, said means for moving said nozzle outlet and said means for removing moisture from said nozzle means including a bimetal member and a heater, said nozzle means being mounted on said bimetal member, said heater being activated at the same time as the activation of said heater means whereby said activated heater causes said bimetal member to move said nozzle means away from said surface means and removes moisture from said nozzle means.

References Cited

UNITED STATES PATENTS

| | | | |
|---|---|---|---|
| 1,916,315 | 7/1933 | Hoffman | 62—140 X |
| 2,345,732 | 4/1944 | Davies et al. | 73—37.6 |
| 2,744,389 | 5/1956 | Raney | 62—140 |
| 2,992,375 | 7/1961 | Mustanen et al. | 73—37.5 X |
| 3,004,399 | 10/1961 | Keller | 62—140 |
| 3,077,747 | 2/1963 | Johnson | 62—140 |
| 3,134,238 | 5/1964 | Matthies | 62—140 |
| 3,194,055 | 7/1965 | Knobel | 73—37.5 |
| 3,321,928 | 5/1967 | Thorner | 62—140 |

ROBERT A. O'LEARY, *Primary Examiner.*

W. E. WAYNER, *Assistant Examiner.*